(12) United States Patent
Suzuki

(10) Patent No.: US 6,334,752 B1
(45) Date of Patent: Jan. 1, 2002

(54) HAND MECHANISM AND LIBRARY APPARATUS

(75) Inventor: Takeshi Suzuki, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,465

(22) Filed: Mar. 15, 2000

(30) Foreign Application Priority Data

Mar. 17, 1999 (JP) ................................................. 11-072706

(51) Int. Cl.[7] .................................................... B65G 1/04
(52) U.S. Cl. ................. 414/274; 250/559.4; 250/559.33; 250/559.11; 414/936
(58) Field of Search .......................... 250/559.4, 559.33, 250/559.11; 414/274, 936

(56) References Cited

U.S. PATENT DOCUMENTS 5,003,188 A * 3/1991 Igari ............................. 250/561
5,225,691 A * 7/1993 Powers .......................... 250/561
5,266,812 A * 11/1993 Mokuo .......................... 250/561

FOREIGN PATENT DOCUMENTS

| JP | 2-149152 | 12/1990 |
|---|---|---|
| JP | 9-2612 | 1/1997 |

* cited by examiner

Primary Examiner—Steven A. Bratlie
(74) Attorney, Agent, or Firm—Young & Thompson

(57) ABSTRACT

A hand mechanism and a library apparatus capable of performing cartridge detection at a high speed as well as reducing the production cost. The library apparatus includes an entry/exit mechanism (container shelf) having a plurality of cells (container chambers) for containing a cartridge and a hand mechanism for taking a cartridge out of the entry/exit mechanism. The cells have a reflection plate (reflector), and the hand mechanism has a sensor (cartridge detector) emitting a detection light and receiving the detection light reflected from the reflection plate. The detection light is simultaneously applied to two or more cells.

4 Claims, 2 Drawing Sheets

HAND MECHANISM AND LIBRARY APPARATUS

BACKGROUND OF THE INVENTION

1. Field of the Invention

The present invention relates to a library apparatus for containing a magnetic tape cartridge or the like and a hand mechanism used in the library apparatus.

2. Description of the Related Art

A magnetic tape library apparatus includes: an entry/exit mechanism wherein a plurality of cells (container chambers) are superimposed on one another in the vertical direction like a book shelf; and a hand mechanism for taking out a cartridge from a cell. When an operator puts a cartridge into the entry/exit mechanism (container shelf), the cartridge is detected and moved from entry/exit mechanism to a predetermined position by the hand mechanism.

In the conventional magnetic tape library apparatus, the cartridge is detected as follows.

The hand mechanism for carrying the cartridge includes a picker unit for grasping and taking out a cartridge in the entry/exit mechanism. The picker unit has a sensor for detecting presence/absence of a cartridge in a cell.

Firstly, the hand mechanism moves to be positioned at a cell (container chamber) where the entry/exit mechanism is found. After this, the sensor detects presence/absence of a cartridge. If a cartridge is present, the cartridge is grasped by the picker unit. If no cartridge is present, the hand mechanism moves to be positioned at the next stage and detects presence/absence of a cartridge.

In this conventional method, in order to detect a cartridge contained in the entry/exit mechanism, the hand mechanism should be positioned at each of the cells to detect presence/absence of a cartridge. That is, the hand mechanism should stop its movement when positioned for a cartridge. This slows down the cartridge detection speed.

Moreover, Japanese Patent Publication No. 09-002612 discloses a cartridge detection method, wherein all the cartridges are provided with a light source and the hand mechanism includes a light reception unit as a sensor, so that a cartridge is detected by receiving the light; or wherein a reflection plate is attached to the end surface of each of the cells and the hand mechanism has a light receiving unit for applying light to the reflection plate and receiving reflected light, so that reflection can decide that no cartridge is contained.

However, this method has a problem of costs for providing a light source on all the cartridges or reflection plates in all the cells.

SUMMARY OF THE INVENTION

It is therefore an object of the present invention to provide a hand mechanism and library apparatus that can perform a high-speed cartridge detection and that can be produced at a reduced cost.

The hand mechanism according to the present invention is for fetching a cartridge contained in a plurality of container chambers provided on a container shelf in a library apparatus, the hand mechanism comprising:

a picker unit for taking out a cartridge; and cartridge detector for applying a detection light in a direction intersecting the cartridge taking out direction and receiving a reflected light.

In this hand mechanism, the detection light is applied in a direction intersecting the cartridge taking out direction. Accordingly, the detection light can be applied simultaneously to a plurality of container chambers.

For example, in FIG. 1, the detection light from the cartridge detector 21 is shown by an alternate long and short dash line. As can be seen from FIG. 1, the detection light intersects the cartridge taking out direction, i.e., the opening direction of the container chambers. The detection light is simultaneously applied to both of the container chamber 13-1 and the container chamber 13-2.

And, for example, a reflection plate 14 is provided in the container chambers for reflecting the detection light in the direction of the detection light. If at least one of the container chambers 13-1 and 13-2 contains a cartridge, no reflection light is received. That is, in the state of FIG. 1, a cartridge is contained in two of the container chambers, the detection light is cut off and no reflection light is generated.

That is, if no reflection light is received, it is found that at least one of the container chambers contains a cartridge, and if reflection light is received, it is found that none of the container chamber contains a cartridge.

The library apparatus according to the present invention comprises: a container shelf including a plurality of container chambers for containing a cartridge; and a hand mechanism for taking out the cartridge contained in the container shelf, wherein the container chambers have reflector, and the hand mechanism includes: a picker unit for taking out the cartridge, and cartridge detector for applying a detection light in a direction intersecting the cartridge taking out direction and receiving a reflected light from the reflector, wherein the detection light is applied over two or more container chambers at once.

In this library apparatus, a detection light is applied to a plurality of container chambers at once. If one of the container chambers contains a cartridge, the detection light is cut off, not reaching the reflector, and no reflection light is received. That is, if no reflection light is received, it is found that at least one of the container chambers contains a cartridge, and if a reflection light is received, it is found that none of the container chambers contains a cartridge.

DESCRIPTION OF THE PREFERRED EMBODIMENTS

Description will now be directed to an embodiment of the present invention with reference to the attached drawings.

Figure 1:
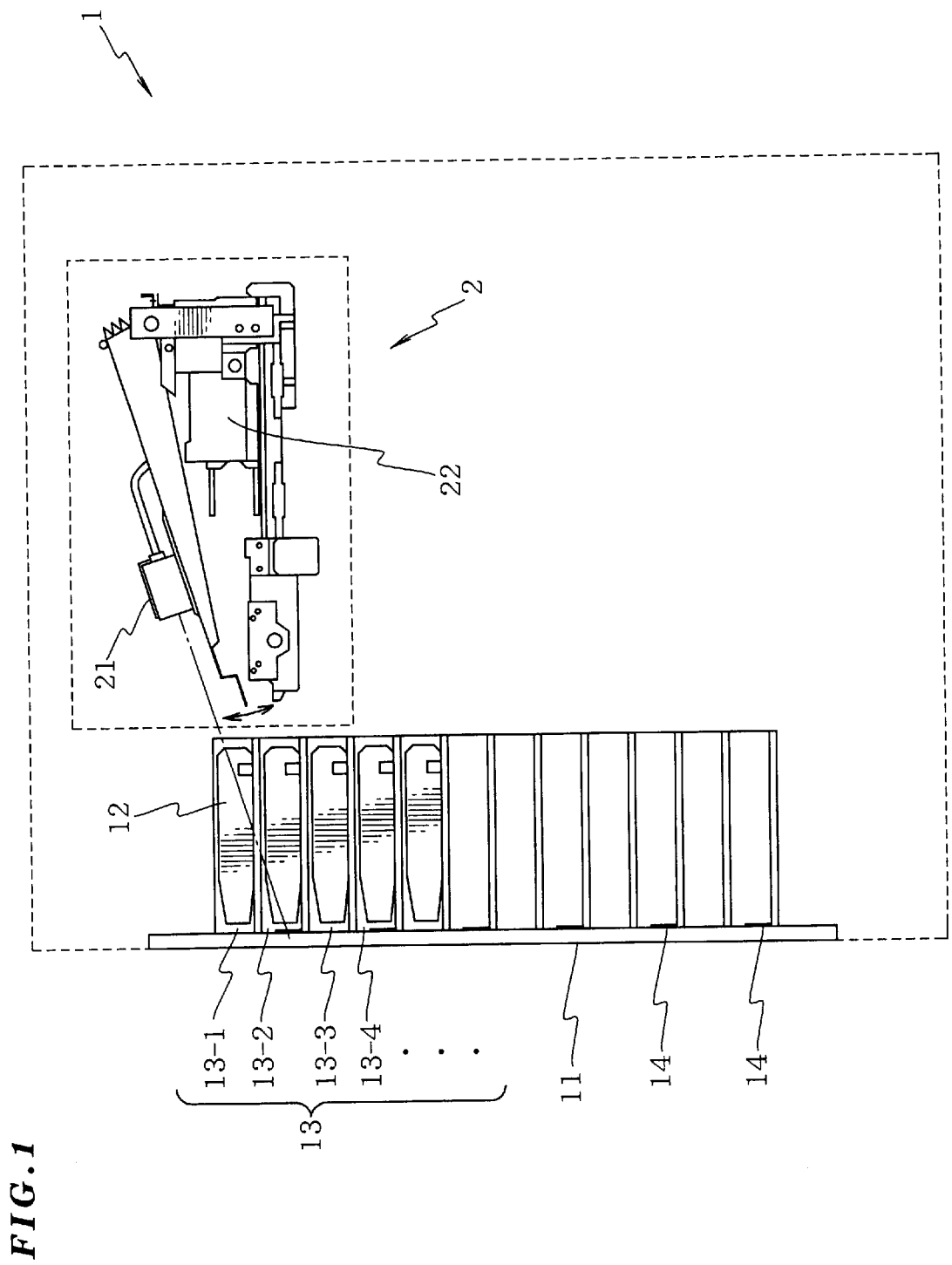
FIG. 1 shows a library apparatus according to an embodiment of the present invention.
Figure 2:
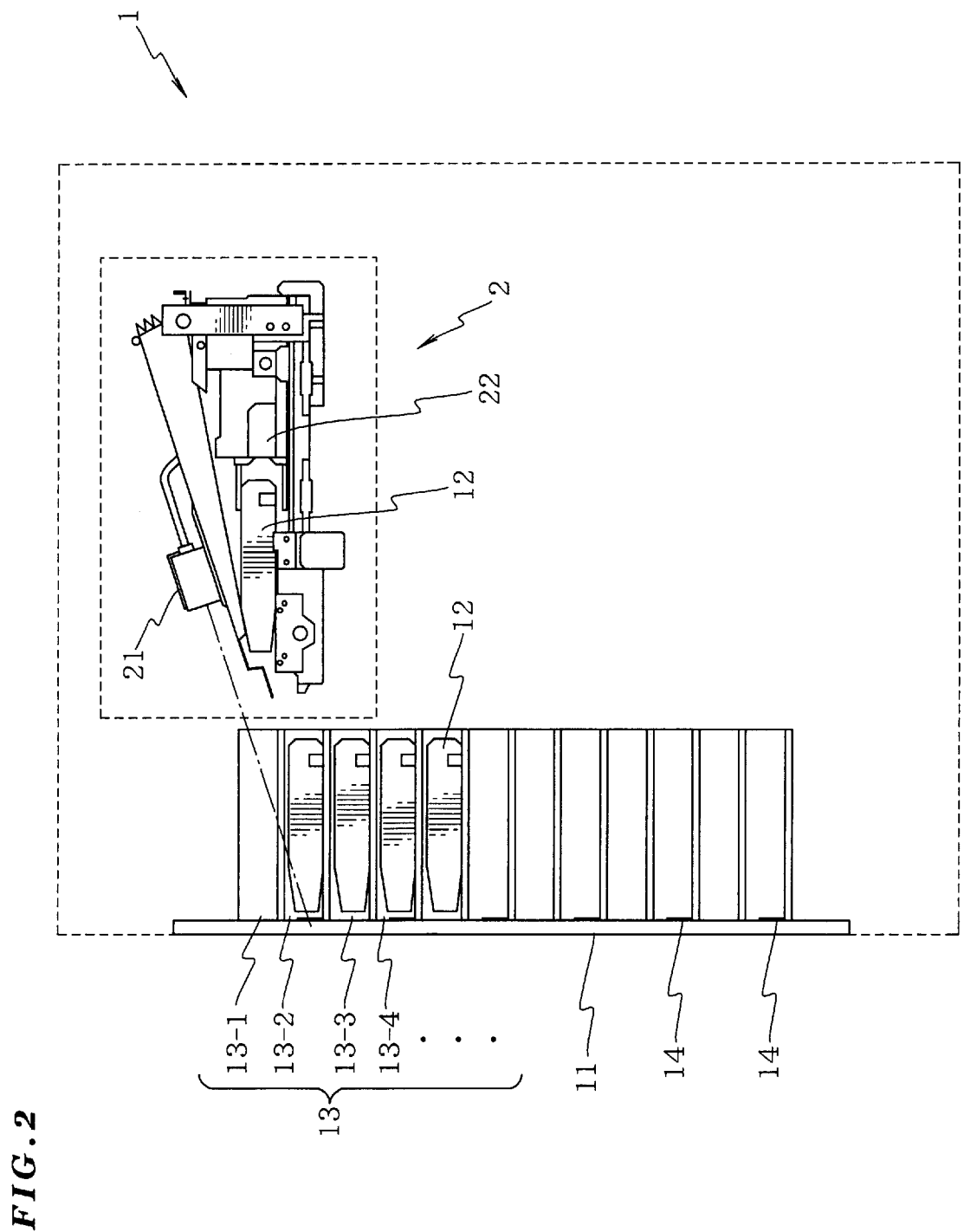
FIG. 2 explains operation of the library apparatus.

FIG. 1 shows a magnetic tape library apparatus according to the present embodiment. The magnetic tape library apparatus 1 includes an entry/exit mechanism (container shelf) 11 in which a plurality of cells (container chambers) 13 for holding the cartridge 12 are arranged in the vertical direction as a plurality of stages. A reflection plate (reflector) 14 is attached to the end surface of every other one of cells 13. The reflection plate is made from a material to reflect light in the same direction as the incoming light even when the light is applied at an angle.

The hand mechanism 2 for conveying the cartridge 2 has a picker portion 22 for grasping the cartridge 12 and a sensor (cartridge detector) 21 for detecting a cartridge. The sensor 21 is arranged above the picker portion 22 for radiating a detection light to the reflection plate 14 and detecting a reflected light.

The sensor applies a detection light downward with respect to a horizontal plane and the angle is defined so that the detection light is applied to two adjacent cells 13, upper and lower cells, as shown in FIG. 1. Here, each cell has an upper wall and lower wall that do not interrupt the detection light path.

The aforementioned magnetic tape library apparatus operates as follows.

Firstly, an operator puts the cartridge 12 in the entry/exit mechanism 11 of the magnetic tape library apparatus 1. Next, the hand mechanism 2 moves to fetch the cartridge 12 in the entry/exit mechanism 11. Here, the hand mechanism 2 is positioned at the uppermost cell 13-1 and the sensor 21 detects presence/absence of the cartridge 12. Because the sensor 21 applies detection light at the angle explained above, the detection light is applied to the cells 13-1 and 13-2.

If no cartridge is contained in any of the cells 13-1 and 13-2, the detection light is reflected by the reflection plate 14 of the cell 13-2 and the reflection light is detected by the sensor 21. The hand mechanism 2 is then positioned not at the cell 13-2 but at the cell 13-3, and presence/absence of the cartridge 12 is detected for the cells 13-3 and 13-4 in the same way as the aforementioned.

If at least one of the cells contain a cartridge 12, the detection light is interrupted by the cartridge 12 and does not reach the reflection plate 14. That is, no reflection light is detected by the sensor 21. In this case, an attempt is made to fetch the cartridge 12 from the cell 13-1. If no cartridge 12 is fetched from the cell 13-1, it is known that the cell 13-2 contains the cartridge, and the hand mechanism 2 is positioned at the cell 13-2 to fetch the cartridge 12. On the other hand, if a cartridge 12 has been fetched from the cell 13-1, the cell 13-2 also has a possibility of containing a cartridge 12, and the hand mechanism 2 is positioned at the cell 13-2 and an attempt is made to fetch a cartridge 12 from the cell 13-2.

After this, the hand mechanism 2 is positioned at the cell 13-3 and the detection is repeated for the cells 13-3 and 13-4 in the same way.

Thus, two cells are checked for presence/absence of a cartridge with one positioning of the hand mechanism 2. This reduces the detection time. Furthermore, the reflection plate is attached to every other cell. This reduces the production cost.

It should be noted that in the above example, the cartridge detection is started at the uppermost cell, but it is also possible to start the cartridge detection at the lowermost cell.

Moreover, in the above example, when it is detected that at least one of two adjacent cells contain a cartridge 12, attempt is made to fetch a cartridge from both of the cells.

In such a case, another method can also be used.

After fetching a cartridge 12 from the cell 13-1, while the hand mechanism 2 is positioned at the cell 13-1, it is possible again to detect presence/absence of a cartridge 12 in the cell 13-1 and 13-2. It is clear that no cartridge 12 is contained in the cell 13-1, this detection identifies presence/absence of a cartridge 12 in the cell 13-2. If the cell 13-2 contains no cartridge 12, there is no need of positioning at the cell 13-2. This further reduces the time required for detection.

Furthermore, it is possible to increase the light application angle of the sensor 21, so that detection is performed for three or more adjacent cells at once. This further in creases the detection speed and the decreased number of reflection plates to reduce the production cost.

Moreover, if the detection speed is more important than the production cost, the reflection plate 14 is attached to all of the cells 13. In this case, at any position of the picker unit 22, an adjacent cell can be checked for presence/absence of a cartridge 12. That is, presence/absence of a cartridge 12 can be known beforehand, and the picker unit 22 can be positioned only at the cells containing a cartridge 12. This significantly increases the detection speed.

Moreover, in the above embodiment, cells 13 are superimposed in the vertical direction. However, it is also possible that the cells are arranged in the horizontal direction and the detection light is moved in the horizontal direction.

As has been described above, the hand mechanism and the library apparatus according to the present invention detects presence/absence of a cartridge in a plurality of cells (container chambers) at once, it is possible to perform a cartridge detection at a high speed.

Moreover, the reflection plate need not be attached to all of the container chambers, which significantly reduces the production cost.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to he embraced within.

The entire disclosure of Japanese Patent Application No. 11-072706 (Filed on Mar. $17^{th}$, 1999) including specification, claims, drawings and summary are incorporated herein by reference in its entirety.

What is claimed is:

1. A hand mechanism including a picker unit for removing a cartridge contained in a plurality of container chambers of a library apparatus, said hand mechanism comprising:

a cartridge detector emitting a detection light and receiving a reflection of the detection light, an optical axis of said emitted detection light intersecting a cartridge removal direction axis.

2. A library apparatus comprising:

a container shelf including a plurality of container chambers, each for containing a cartridge;

a reflector in at least every other one of the container chambers; and a hand mechanism comprising a picker unit for removing the cartridge contained in the container shelf, and a cartridge detector emitting a detection light having an optical axis intersecting a cartridge removal direction and receiving a reflection of the detection light from one of the reflectors, the optical axis of said detection light extending through at least two of the container chambers.

3. library apparatus as claimed in claim 2, wherein the reflectors are in every container chamber.

4. The library apparatus as claimed in claim 2, wherein the cartridge detector is adjustable so that an emitted angle of the detection light changes.

* * * * *